No. 730,186. PATENTED JUNE 2, 1903.
A. W. CASE.
CONDUIT AND SEWER ROD COUPLING.
APPLICATION FILED MAY 31, 1902.
NO MODEL.

Witnesses:
Edwin P Luce
S. Ethel Haynes

Inventor:
Albert W. Case,
by Frederick L. Emery
Atty.

No. 730,186. Patented June 2, 1903.

UNITED STATES PATENT OFFICE.

ALBERT W. CASE, OF BROOKLINE, MASSACHUSETTS.

CONDUIT AND SEWER ROD COUPLING.

SPECIFICATION forming part of Letters Patent No. 730,186, dated June 2, 1903.

Application filed May 31, 1902. Serial No. 109,580. (No model.)

*To all whom it may concern:*

Be it known that I, ALBERT W. CASE, a citizen of the United States, residing at Brookline, in the county of Norfolk and State of Massachusetts, have invented an Improvement in Conduit and Sewer Rod Couplings, of which the following description, in connection with the accompanying drawings, is a specification, like letters on the drawings representing like parts.

My invention relates to couplings used for joining rods employed in cleaning or clearing the interiors of conduits, sewer-pipes, and the like or for deep-well rods, &c.

The aim of my invention is to provide a coupling simple and inexpensive in construction and at the same time one that will effectually withstand the torsional or twisting action usually required for the clearing or cleaning of pipes and one also that will maintain the perfect alinement of its coöperating members, thereby to prevent it catching upon the walls or projections in the pipes during insertion or withdrawal of the rod.

My invention will be best understood from a description of one embodiment thereof.

Figure 1:
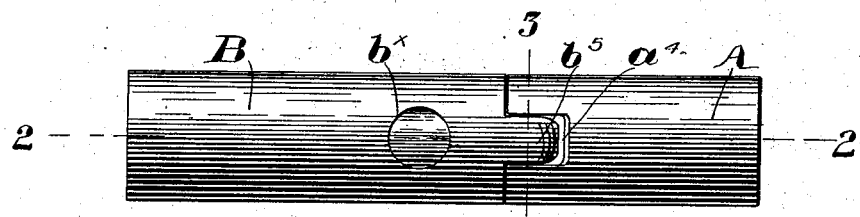
Figure 2:
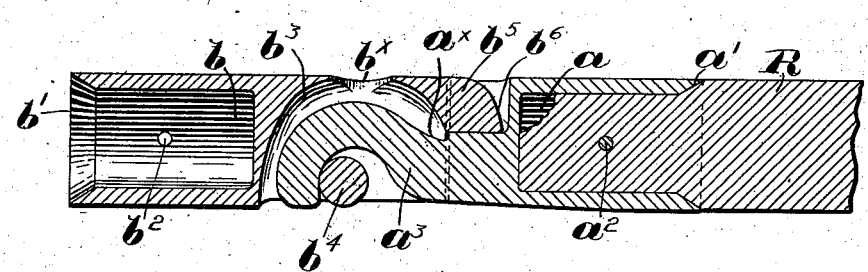
Figure 3:
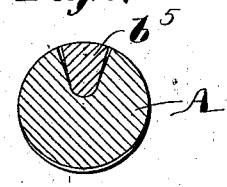
Figure 4:
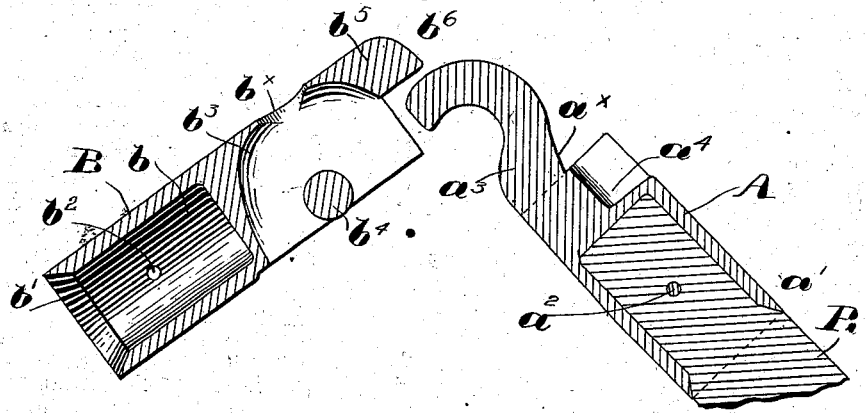

In the accompanying drawings, Figure 1 is a top view of a coupling, illustrating one form of my invention. Fig. 2 is a longitudinal section thereof on the dotted line 2 2, the end of one of the rods being also shown. Fig. 3 is a cross-section on the dotted line 3 3, Fig. 1; and Fig. 4, a sectional view showing the coupling members separated and in position preparatory to engagement or coupling.

In the particular embodiment of my invention selected for illustration herein and shown in the drawings my improved coupling comprises two members A B, presenting a generally cylindrical exterior shape and at their outer ends respectively socketed at $a$ $b$ to receive the ends of the usually wooden rods, to which they are attached and which it is desired to couple or connect. One of these rods R is shown attached to the member A, and as such rod should be of the same exterior diameter as the coupling to avoid any circumferential projection or obstruction it is necessary to reduce the end of such rod for entrance into the socket $a$. As an abrupt or square shoulder at this point would tend to weaken the rod thereat, I have beveled the end walls of the coupling member, as indicated at $a'$ $b'$, to permit the reduction in diameter of the rods, also to be by bevels, thereby greatly adding to the strength of the rods. The contact of the bevel or conical surfaces upon the rods and coupling members, respectively, also insures a snug or perfect fit between the abutting surfaces, thereby adding to the stability of the union. Pins at $a^2$ $b^2$ may be driven through the sockets and the ends of the rods therein to render the attachment more secure.

The coupling members may be provided with any suitable means for attaching one to the other so as to permit one to be moved longitudinally by the other. I have herein shown one of the members A provided with a projecting hook $a^3$, adapted to enter a recess $b^3$ in the opposing end of the other member, to be hooked behind and locked with a cross-bar or locking-surface $b^4$ in such recess, as best shown in Fig. 2. The hook may be readily engaged and disengaged by turning the members into angular positions, as clearly indicated by Fig. 4. So long as the alinement of the coupling members is substantially preserved, as in Figs. 1 and 2, the locking of the one longitudinally to the other is secure and permanent, and as this alinement is necessarily maintained by the inner walls of the conduit or pipe in which the rods are used there is no liability of the members becoming disengaged or uncoupled during use.

To relieve the hook $a^3$ from a part at least of the twisting or torsional action usually given to rods while cleaning or clearing conduits or pipes, and thus to render such hook less liable to break off when in use, I have provided means wholly independent of the hook $a^3$ for locking the two members one to the other to resist this torsional or twisting action. Such means, as herein shown, comprises a longitudinally-projecting lug $b^5$ on one of the members, as B, which lug is adapted to enter a correspondingly-shaped recess $a^4$ on the opposing member A. With the lug and recess positioned as shown when the hook is engaged with the locking-bar $b^4$ and the two members are turned or swung up into alinement the lug $b^5$ drops into its recess $a^4$, (see Figs. 1 and 2,) thus preventing any twist of one member relative to the other. To insure accuracy of fit, I prefer to make both the lug $b^5$ and its recess $a^4$ wedge shape in cross-section. (See Fig. 3.) The ample surfaces in contact between the bottom of this lug $b^5$ and the bottom of its recess $a^4$ also insure permanency of alinement of the two members, which would not be the case were the contact alone relied upon between the back of the hook at $a^\times$ and the adjacent wall of the opposing member, which is necessarily thin at that point to give ample room in the recess $b^3$. This thin opposing wall if alone relied upon would quickly wear back and permit the members to be turned beyond their positions of true alinement. The twist-resisting lug $b^5$ is rounded off or beveled at its end $b^6$, so that in the event of its projecting slightly above the adjacent circumferential surface of its coöperating member, due to slight bending of the coupling or to the presence of dirt between the locking or stop surfaces, such projection will not catch any opposing projection at the interior of the conduit-pipe, but will by reason of such rounded or beveled surface be deflected over and past such opposing projection, and thereby clear the latter.

The chamber or recess $b^3$, which receives the hook $a^3$, has an opening $b^\times$ for the escape of dirt that might otherwise interfere with the locking engagement of the coupling members.

My invention is not limited to the particular embodiment here shown and described.

I claim—

1. A coupling of the within class comprising coöperating members provided, one with a locking-hook and the other with a locking-surface for engagement therewith to flexibly connect said members one longitudinally to the other, one of said members having also a projecting lug with an outer beveled face and a recess therefor in the other of said members.

2. A flexible coupling of the class described comprising coöperating members provided one with a locking-hook and the other with a coöperating locking-surface, the latter being provided with a lug and the former with a recess at the shank of the hook to receive said lug.

3. A coupling of the class described comprising a coupling member having a substantially cylindrical shank, a hook projecting from the end of said cylindrical shank, a second cylindrical coupling member having a recessed portion to admit said hook, a coöperating locking-surface to retain the same, a lug projecting from the end of said second member and adapted to coöperate with a recess in the first locking member when said members are brought into locking engagement.

In testimony whereof I have signed my name to this specification in the presence of two subscribing witnesses.

ALBERT W. CASE.

Witnesses:
  FREDERICK L. EMERY,
  S. ETHEL HAYNES.